(12) United States Patent
Baldwin

(10) Patent No.: US 11,761,563 B2
(45) Date of Patent: Sep. 19, 2023

(54) REINFORCED HOSE END CONNECTOR HAVING A SMOOTH SURFACE INBOARD END LENGTH

(71) Applicant: Gardner T. Baldwin, Houston, TX (US)

(72) Inventor: Gardner T. Baldwin, Houston, TX (US)

( * ) Notice: Subject to any disclaimer, the term of this patent is extended or adjusted under 35 U.S.C. 154(b) by 280 days.

(21) Appl. No.: 16/815,824

(22) Filed: Mar. 11, 2020

(65) Prior Publication Data

US 2020/0292105 A1    Sep. 17, 2020

Related U.S. Application Data

(60) Provisional application No. 62/818,931, filed on Mar. 15, 2019.

(51) Int. Cl.
| | |
|---|---|
| F16L 11/08 | (2006.01) |
| F16L 33/00 | (2006.01) |
| F16L 33/207 | (2006.01) |
| F16L 33/01 | (2006.01) |

(52) U.S. Cl.
CPC ............ F16L 11/08 (2013.01); F16L 33/003 (2013.01); F16L 33/01 (2013.01); *F16L 33/2073* (2013.01); *F16L 33/2076* (2013.01)

(58) Field of Classification Search
CPC ......... F16L 11/08; F16L 33/003; F16L 33/01; F16L 11/20; F16L 11/083; F16L 13/141; F16L 13/142; F16L 33/22; F16L 33/26; F16L 33/28; F16L 13/14; F16L 33/2073; F16L 57/02; F16L 33/207; F16L 33/2076

USPC ............ 285/382, 222.1, 222.2, 222.3, 222.4, 285/222.5
See application file for complete search history.

(56) References Cited

U.S. PATENT DOCUMENTS

| | | | |
|---|---|---|---|
| 2,661,225 A * | 12/1953 | Lyon | 285/222.4 |
| 2,965,395 A | 12/1960 | Schmohl et al. | |
| 3,347,571 A | 10/1967 | New | |
| 3,423,109 A * | 1/1969 | New | F16L 33/2073 285/222.1 |
| 3,578,360 A * | 5/1971 | Eliot | |
| 4,106,526 A | 8/1978 | Szentmihaly | |
| 4,212,487 A | 7/1980 | Jones et al. | |
| 4,226,446 A | 10/1980 | Burrington | |
| 4,330,142 A | 5/1982 | Paini | |
| 4,564,223 A | 1/1986 | Burrington | |
| 4,569,541 A | 2/1986 | Eisenzimmer | |
| 4,664,424 A | 5/1987 | Smith | |

(Continued)

FOREIGN PATENT DOCUMENTS

| | | | |
|---|---|---|---|
| DE | 19635053 A1 * | 3/1998 | F16L 33/2076 |
| EP | 0260547 B1 * | 4/1989 | |

(Continued)

*Primary Examiner* — Zachary T Dragicevich
*Assistant Examiner* — William S. Choi

(57) ABSTRACT

An improved end connector for a high-pressure reinforced hose that is subjected to high frequency of pressure cycles and that provides for a low compression deformation of the reinforced hose is discussed. This unique end connector has a stem and ferrule that includes a gripper or cable lock region near a coupler, or outboard end and a substantially smooth length on an outer diameter (OD) of the stem and ferrule that extends from about the gripper region to a hose receiving, or inboard, end.

13 Claims, 7 Drawing Sheets

(56) References Cited

U.S. PATENT DOCUMENTS

| | | | |
|---|---|---|---|
| 4,850,619 A * | 7/1989 | Lantos | F16L 33/01 |
| | | | 285/222.4 |
| 5,044,671 A | 9/1991 | Chisnell et al. | |
| 5,076,615 A | 12/1991 | Sampson | |
| 5,165,733 A | 11/1992 | Sampson | |
| 5,349,988 A | 9/1994 | Walsh et al. | |
| 6,220,303 B1 * | 4/2001 | Secher | |
| 6,378,914 B1 | 4/2002 | Quaranta | |
| 6,505,649 B1 | 1/2003 | Dixon-Roche | |
| 7,338,090 B2 | 3/2008 | Baldwin et al. | |
| 8,439,405 B2 | 5/2013 | Trujillo et al. | |
| 9,212,771 B2 | 12/2015 | Baldwin et al. | |
| 10,514,120 B2 * | 12/2019 | Gilbreath | F16L 33/2073 |
| 2002/0084650 A1 * | 7/2002 | Campbell | F16L 33/2076 |
| 2004/0130148 A1 * | 7/2004 | Patterson | F16L 33/2076 |
| 2009/0160184 A1 * | 6/2009 | Vo | F16L 33/01 |
| 2010/0117355 A1 * | 5/2010 | Lamontia | F16L 33/2073 |
| | | | 285/222.2 |
| 2011/0068572 A1 * | 3/2011 | Nacsa | F16L 33/2073 |
| 2015/0176735 A1 * | 6/2015 | Baldwin | F16L 33/2073 |
| 2015/0292661 A1 * | 10/2015 | Gilbreath | F16L 33/2073 |
| 2015/0362109 A1 * | 12/2015 | Buchanan | F16L 33/22 |

FOREIGN PATENT DOCUMENTS

| | | | | |
|---|---|---|---|---|
| GB | 2487506 A * | 7/2012 | | |
| JP | 2006002911 A * | 1/2006 | | F16L 33/2076 |

* cited by examiner

REINFORCED HOSE END CONNECTOR HAVING A SMOOTH SURFACE INBOARD END LENGTH

CROSS-REFERENCE TO RELATED APPLICATION

This application claims the benefit of U.S. Provisional Application Ser. No. 62/818,931, filed on Mar. 15, 2019, entitled "TWO-STEP SWAGE FITTING," commonly assigned with this application and incorporated herein by reference in its entirety.

TECHNICAL FIELD

This application is directed, in general, to a low compression hose connector and to a method of manufacturing the connector in a one or multiple-step ferrule forming process for use in high pressure/high cycle applications.

BACKGROUND

High-pressure hoses are used in many instances in industry but particularly in the mining, construction, energy, marine and petrochemical industries. These industrial applications typically require the use of high-pressure hoses to transfer fluids from one component to another and endure the operational conditions associated with these industries. The high-pressure hose is attached to a metal coupler or connector that allows the hose assembly to be quickly coupled and decoupled to and from the operational equipment that is being used. While the hose material itself can be manufactured to withstand the operational wear, high pressures and/or temperatures, the point of failure of the high-pressure hose often occurs where the metal coupler is attached to the hose. Even when a hose is crimped tightly onto the hose, failure can still occur, which can result in operational failure of the high-pressure hose.

One application for the use of these high-pressure hoses is in the drilling industry. A flexible rubber hose runs between the pump piping system on the rig and the kelly that is coupled to the rotating drill string. In such applications, the flexible hose is subjected to high pressures and/or high frequency of pressure cycles. The high pressure is required to transfer drilling fluid into the well bore and overcome static return head pressures—the deeper the wellbore, the higher the pressure. The rotary drilling hose is also subject to further stresses in that it hangs down within the derrick supported at either end by the metal coupling on the hose and the fact that the kelly is moved up and down literally thousands of times during the drilling operation. This can result in the hose being subjected to stress at the metal coupling (in addition to being subject to stress throughout its length). If the hose breaks, circulation may be lost resulting in a well blowout situation. Thus, a highly reliable bond between the hose and the coupling is required for protection of personnel and equipment.

SUMMARY

One aspect provides an end connector for a reinforced hose, comprising: a stem having an inner diameter (ID) and outer diameter (OD), a coupler end, and a hose receiver end, and a fluid passageway defined by the ID. The OD includes a first hose gripper region located adjacent the coupler end that defines a first length of the stem. A second length of the OD extends from the first hose gripper region to the hose receiver end. The second length has a substantially smooth surface, except for one or more grooves for sealing elements formed therein. In this embodiment, one or more grooves for sealing elements that are formed in the substantially smooth surface are also present. A ferrule is attached to the stem at ferrule coupling point and has an ID, including a second hose gripper region that opposes the first hose gripper region and defines a first length of the ferrule. A second length of the ID of the ferrule opposes the second length of the stem and the second length of the ferrule has a substantially smooth surface. A cavity is located between the OD of the stem and the ID of the ferrule that extends from the ferrule coupling point to the end of the ferrule and is configured to receive an end of a reinforced hose therein.

Other embodiments of this disclosure provides a reinforced hose assembly, comprising: a stem having an inner diameter (ID) and outer diameter (OD), a coupler end, and a hose receiver end, and a fluid passageway defined by the ID. The OD includes a first hose gripper region located adjacent the coupler end that defines a first length of the stem. A second length of the OD extends from the first hose gripper region to the hose receiver end. The second length has a substantially smooth surface, except for one or more grooves for sealing elements formed therein. In this embodiment, one or more grooves for sealing elements that are formed in the substantially smooth surface are also present. A ferrule is attached to the stem at ferrule coupling point and has an ID, including a second hose gripper region that opposes the first hose gripper region and defines a first length of the ferrule. A second length of the ID of the ferrule opposes the second length of the stem and the second length of the ferrule has a substantially smooth surface. A cavity is located between the OD of the stem and the ID of the ferrule that extends from the ferrule coupling point to the end of the ferrule. The cavity is configured to receive an end of a reinforced hose therein. A reinforced hose is coupled to the end connector and has, an inner liner, an outer cover, and a reinforcement layer located between the inner liner and the outer cover. A first end of the reinforced hose has a skived section that exposes a portion of the reinforcement layer. The first end is received within the cavity such that the exposed reinforcement layer is gripped by the first and second grippers between the first and second gripper regions, and where the inner liner engages one or more sealing elements.

Another embodiment of this disclosure provides a method for fabricating a reinforced hose assembly, comprising; inserting a skived end of a reinforced hose into a gripper region of an end connector, the gripper cavity being located between an outer diameter (OD) of the stem and an inner diameter (ID) of a ferrule attached to the stem at a ferrule coupling point, the skived end having an exposed reinforcement layer and inserting the skived end within the gripper cavity, positions an inner liner of the reinforced hose adjacent the gripper region and positions the inner liner against one or more sealing elements located in a substantially smooth length of an outer diameter (OD) of the stem that extends from the hose inner liner dam to a hose receiver end of the stem; and performing one or more ferrule forming operations and causing hose grippers of the stem and the ferrule to contact and force the exposed reinforcement layer between the hose grippers.

BRIEF DESCRIPTION

Reference is now made to the following descriptions taken in conjunction with the accompanying drawings, in which.

DETAILED DESCRIPTION

The embodiments of this disclosure are directed to an improved end connector for a high-pressure reinforced hose and particularly for a hose subjected to high frequency of pressure cycles that provides for a low compression deformation of the reinforced hose, after being formed onto the connector/coupler and reduces the occurrence of failure that can occur at the point where the reinforced hose is coupled to the end connector. As used herein, "formed" or "forming" means a process of pressing the end connector against a hose to bind the connector to the hose. Examples of ferrule forming processes include known swaging and crimping processes. The embodiments of this disclosure provide a unique connector that comprises a stem and ferrule that includes a gripper or cable lock region near a coupler, or outboard end. These embodiments also include a substantially smooth length on an outer diameter (OD) of the stem that extends from about the gripper region to a hose receiving, or inboard end. As used herein and in the claims, "substantially smooth" means that the surface is free of barbs, bumps, flutes, lands, grooves, spines, or any other similar type of protrusion extending from the surface, but it may or may not have one or more grooves that are purposefully formed in the smooth surface to receive a sealing element therein. However, the surface is also considered substantially smooth even though there might be small or microscopic manufacturing imperfections in the surface that can result from a manufacturing process. The substantially smooth length may also include one or more seals located near a hose receiver, or inboard, end that provides a good seal for high pressure applications, while minimizing damage to the hose during the ferrule ferrule forming process. During forming the connector onto the reinforced hose, the substantial smooth length is forced against the one or more seals. The combination of features of the embodiments presented herein allows lower compression of the reinforced hose during the ferrule forming process, which minimizes damage to the integrity of the reinforced hose located between the stem and ferrule.

Figure 1:
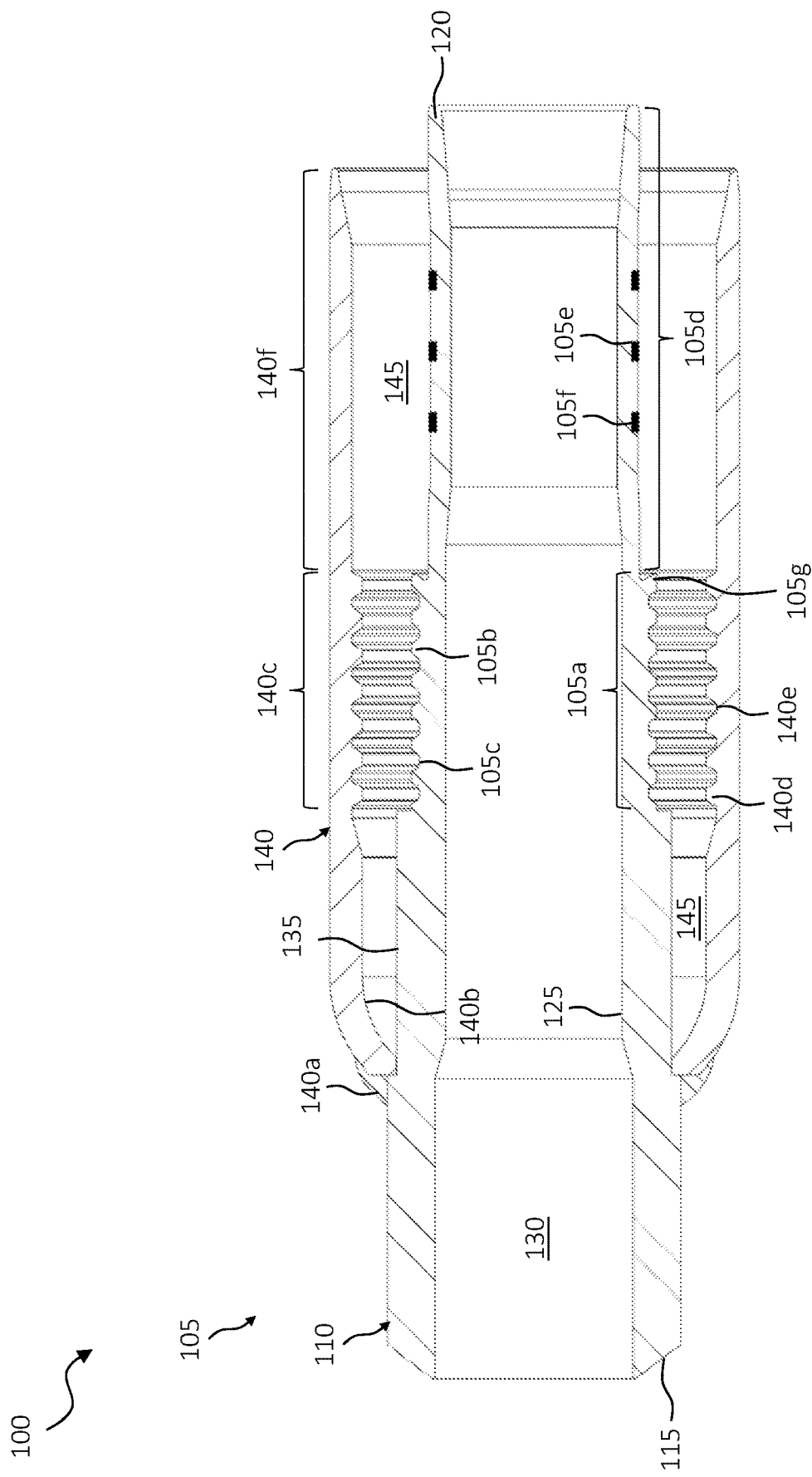
FIG. 1 is a sectional view of one embodiment of an end connector.

FIG. 1 is a sectional view of an embodiment of an end connector 100 as provided by this disclosure prior to the insertion of a reinforced hose. In the illustrated embodiment, the end connector 100 comprises a generally cylindrical stem 105, whose geometric shape may vary, that has an elongated body 110, and a coupler or outboard end 115, and an opposing hose receiver, or inboard, end 120. An inner surface, or inner diameter (ID) 125 of the elongated body 110, forms a fluid passageway 130 through the stem 105, as shown. Though the embodiment illustrated in FIG. 1 shows the fluid passageway 130 having different IDs, in other embodiments, as discussed below, the ID of the fluid passageway 130 may be substantially uniform throughout the length of the stem 105. The stem 105 also includes a hose gripper region 105a located in the outer diameter (OD) 135 of the stem 105 adjacent the coupler end 115. The hose gripper region 105a defines a first length of a portion of the length of the fluid passageway 130, as used herein and in the claims. In one embodiment, the hose gripper region 105a comprises stem hose grippers 105b and 105c, such as circumferential spines and grooves, whose configurations may vary based on design parameters. For example, the stem hose grippers 105b and 105c may include other types of design configurations, such as flutes and land, barbs, bumps, or other types of gripping features. During a ferrule forming process, the stem hose grippers 105b and 105c are forced into and grip a reinforcement layer of a reinforced hose when the end connector 100 is formed onto a reinforced hose.

As seen in the illustrated embodiment, the ID of the coupler end 115 is larger than the ID of the first length of the gripper region 105a. However, as noted above, in other embodiments, these IDs may be the same. The stem 105 also includes a second length 105d of the OD 135 of the stem 105 that extends from about the first hose gripper region 105a to the hose receiver end 120. The second length 105d has a substantially smooth surface, as defined above, except for one or more grooves for sealing elements 105e formed in the OD 135 of the stem 105. Whether one or more are present, the sealing groove 105e is designed to hold a sealing element 105f therein, such as an elastomeric "O" ring. The substantially smooth surface of the second length 105d, provides advantages over prior designs in that its presence allows for less radial compression of the reinforce hose during ferrule forming process. In the illustrated embodiment the fluid passageway 130 extends along the second length 105d that has an ID diameter that is smaller than the ID of the fluid passageway 130 along the first length 105a. In such embodiments, an optional expansion step may be conducted prior to any ferrule forming processes to force the second length 105d against the one or more sealing elements 105f to provide an effective seal against the inner liner 220. When the optional expansion step in not conducted, the seal is established with the ferrule forming to force the inner liner 220 against the one of more sealing members 105f. Additionally, when the second length 105d is pressed against the one or more sealing elements 105f, it facilitates an area where a reinforced hose suffers very little or no diameter compression damage along the second length 105d. For example, in one embodiment, the amount of diameter compression may be a maximum of about 10%, (±1.0%). In another embodiment the maximum compression is 10%. This low compression guards inner liner creep, thereby reducing radial compression and facilitating a tight enough fit to cause the one or more sealing elements 105f to hold against an internal hose pressure that is at least two and one half times the working pressure, as required by the American Petroleum Institute (API) for a Grade E-type hose.

In another embodiment, a hose inner liner dam 105g may be present. The hose inner liner dam 105g delineates a separation point of the hose gripper region 105a from the second length 105d. When a reinforced hose is inserted into the connector 100, the hose inner liner dam 105g acts as a stop for the inner liner of a skived reinforced hose. As seen in the illustrated embodiment, the face of the hose inner liner dam 105g is angled toward the hose receiver end 120, which provides added wedge shape for holding the inner liner of the reinforced hose in place. The hose inner liner dam 105g is an optional feature and may not be present in all embodiments.

The embodiment of FIG. 1 further illustrates a ferrule 140 attached to the stem 105 at a ferrule coupling point 140a. The ferrule 140 may be attached to the stem 105 by any known means, such as by welding. The ferrule 140 has an ID 140b and a hose gripper region 140c that opposes the hose gripper region 105a of the stem 105 and defines a first length of a portion of the length of the ferrule 140. In one embodiment, where the hose inner liner dam 105g is present, the hose gripper region 105a extends to the hose inner line dam 150g, and the hose gripper region 104c extends to a point approximately radially opposite the hose inner liner dam, that is, the hose gripper region's 104c position relative to the hose inner liner dam 105g is sufficient to allow the designed gripping function to occur. In one embodiment, the hose gripper region 140c also includes ferrule hose grippers 140d and 140e, such as circumferential spines and grooves, respectively. The ferrule hose grippers 140d and 140e may have the same configuration as the stem hose grippers 105b and 105c of the stem 105 or a different configuration, depending on design parameters. The ferrule 140 also has a second length 140f that extends from the hose gripper region 140c to the hose receiver end 120 and has a substantially smooth surface that radially opposes the substantially smooth surface 105d of the stem 105. The OD 135 of the stem 140 and the ID 140b of the ferrule 140 form a cavity 145 that extends from the ferrule coupling point 140a to the hose receiver end 120. The cavity 145 is configured, that is has a space between the stem 105 and ferrule 140, to receive an end of a reinforced hose therein.

Figure 2:
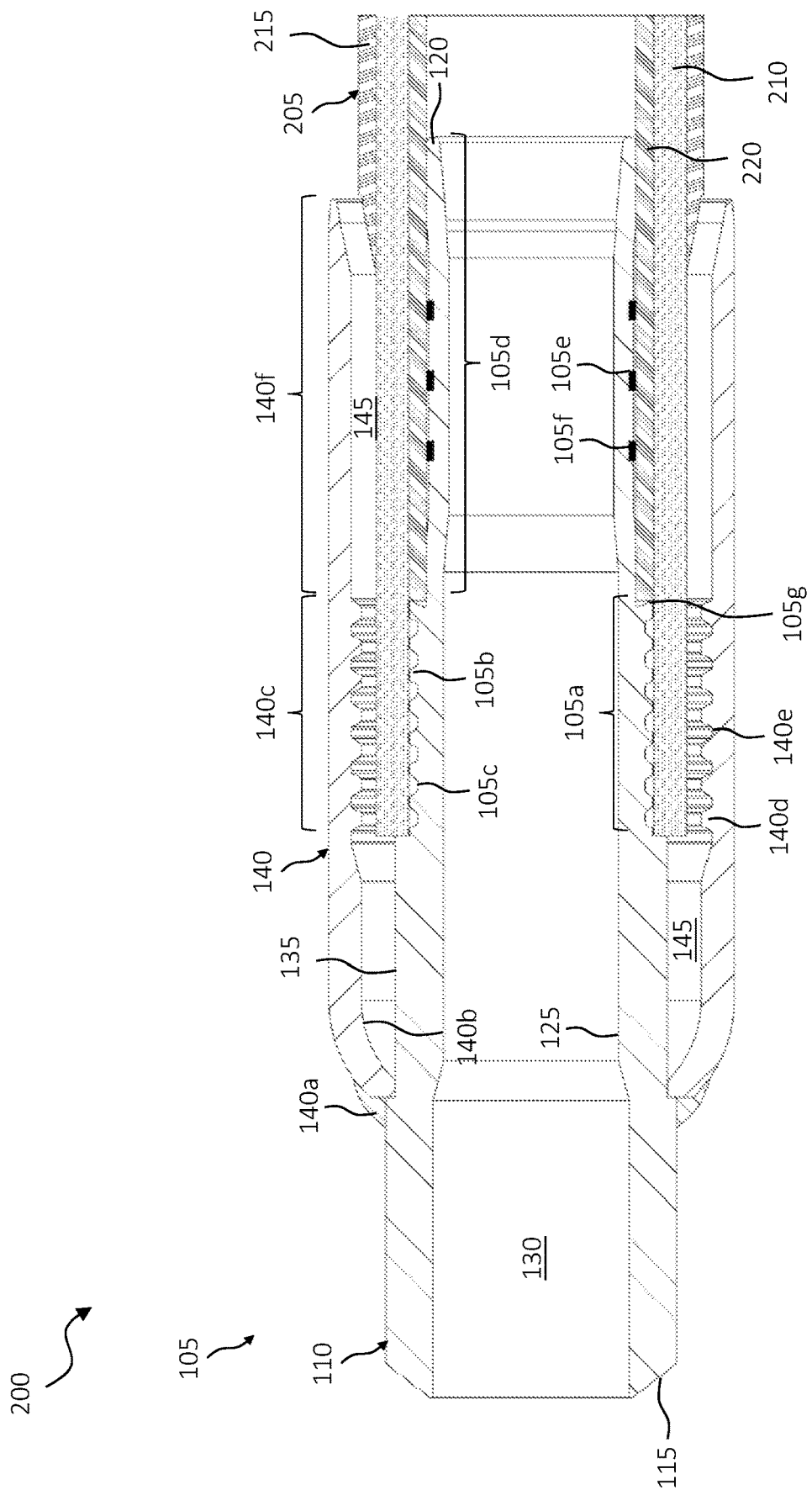
FIG. 2 is a sectional view of a hose assembly prior to an optional stem expansion ad a ferrule ferrule forming process being conducted.

FIG. 2 illustrates an embodiment of a reinforced hose assembly 200. The end connector 100 of FIG. 1 is shown, so the same component designations are used for consistency. This embodiment shows a skived reinforced hose 205 inserted into the cavity 145. FIG. 2 illustrates the manufacturing process prior to any ferrule forming process and merely illustrates the point of manufacture after the reinforced hose 205 has been inserted into the connector 200. In this embodiment, the reinforced hose 205 has been skived to expose a reinforcement layer 210 that is positioned between the first and second gripper regions 105a and 140c. As shown, an outer cover 215 of the reinforced hose 205 has been skived such that its skived edge stops at the hose receiver end 120. An inner liner 220 has been skived such that its skived edges stops against the hose inner liner dam 105g, when present. When positioned in the cavity 145, the skived portion extends over the second length 105d and the one or more sealing elements 105f, as illustrated. Further, at this point of assembly, any optional expansion process has not been conducted because the ID of the fluid passageway 130 along the second length 105d is smaller than the ID of the fluid passageway 130 along the first length 105a.

Figure 3:
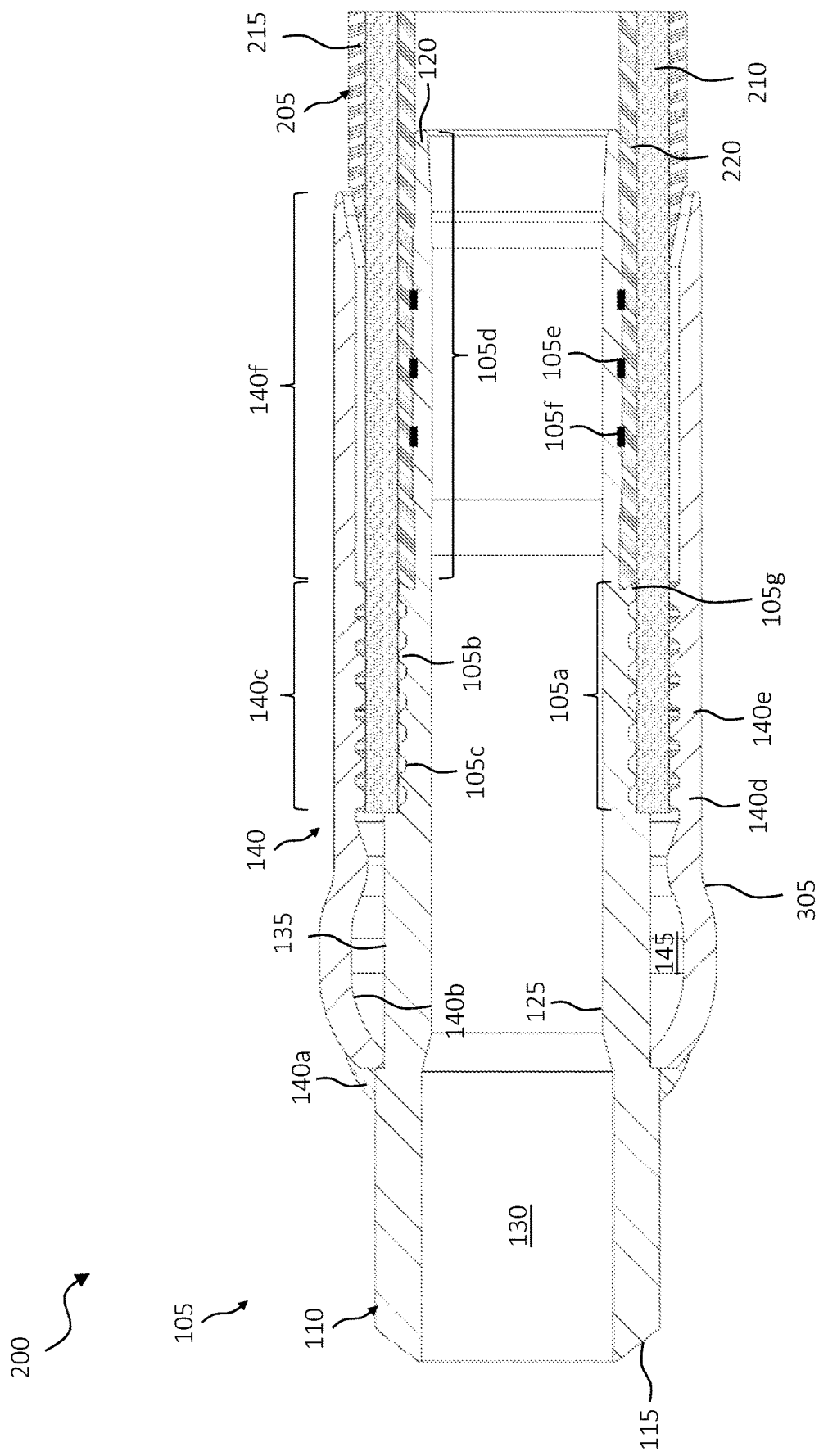
FIG. 3 is a sectional view of the hose assembly of FIG. 2 subsequent to stem expansion and an optional first ferrule ferrule forming process being conducted on the end connector.

FIG. 3. Illustrates the reinforced hose assembly 200 of FIG. 2 after a first ferrule forming process and an optional expansion process have been conducted. When used, the expansion process is conducted prior to any ferrule forming process and may be conducted using known expansion processes for expanding the stem. In one embodiment, the expansion process is beneficial in that it expands the ID of the fluid passageway 130 along the second length 105d such that it can be approximately the same ID of the fluid passageway along the first length 105a. The expansion also provides additional sealing force, as mentioned above. The first ferrule forming process bends the ferrule 140 at a swaging point 305. However, at this point, the first ferrule forming process does not cause the stem and ferrule hose grippers 105b, 105 and 140d, 140e, respectively, to contact the reinforcement layer 210, but brings them into very close proximity to the reinforcement layer 210. This first ferrule forming action reduces compressional damage to the reinforced hose 205 because it allows the axial elongation caused by the ferrule.

Figure 4:
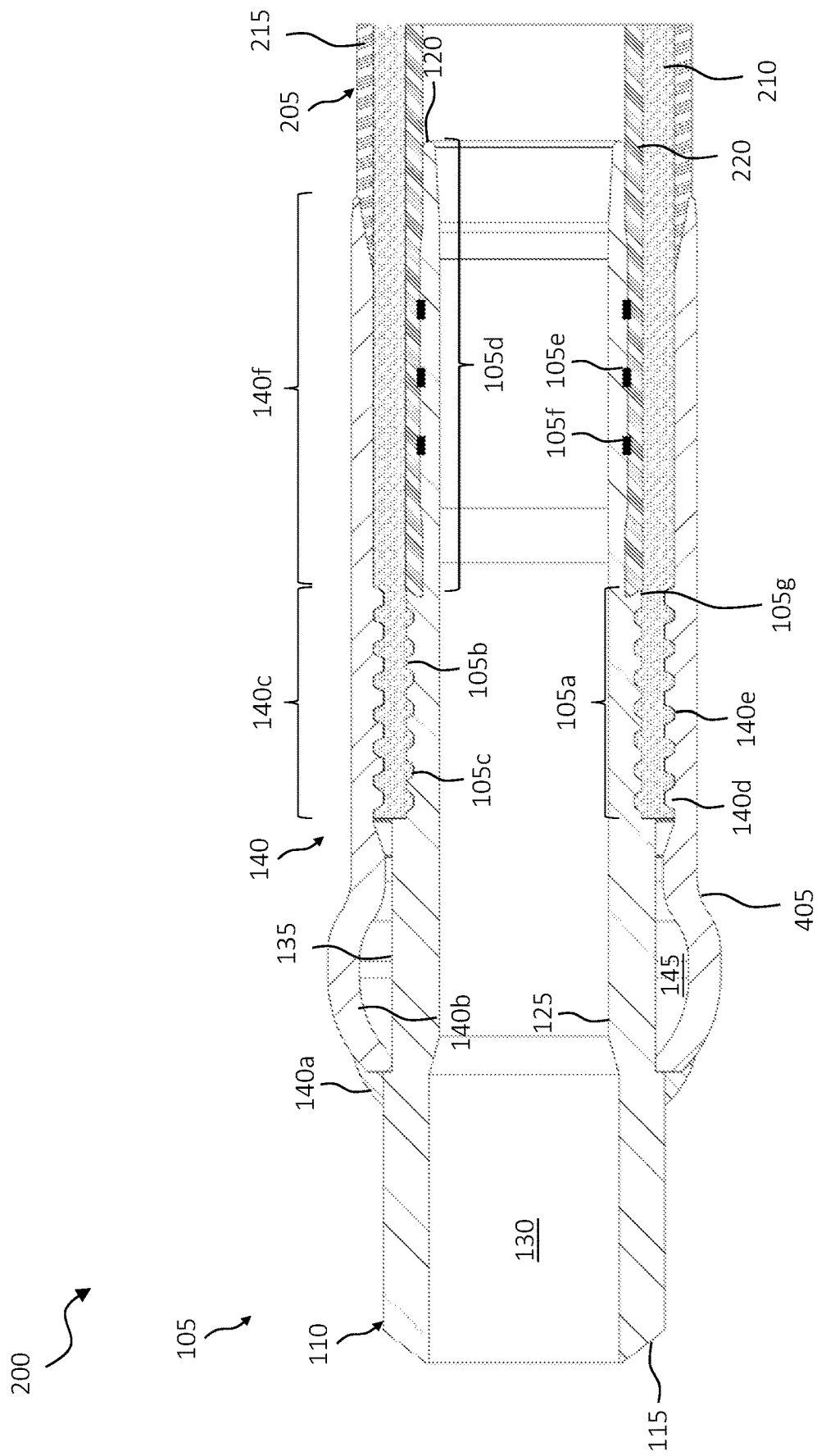
FIG. 4 is a sectional view of the hose assembly of FIG. 3 subsequent to a second ferrule ferrule forming process being conducted on the end connector.

FIG. 4. Illustrates the reinforced hose assembly of 200 of FIG. 3 after a second ferrule forming process. It should be noted that in some embodiments, only the second ferrule forming process is used, due to the dimensions of the type of reinforced hose being used, making the first forming process unnecessary, while still resulting in a low compressed hose within the end connector 200. The second ferrule forming process further bends the ferrule 140 at crimping point 306. However, unlike the first ferrule forming process, if present, the second ferrule forming process firmly drives the stem and ferrule hose grippers 105b, 105c and 140d, 140e, respectively, into the reinforcement layer 210, to effectively lock the reinforcement layer 210 into place within the gripper regions 105a and 140c, without causing compressional damage to the reinforced hose 205. In one embodiment, the reinforcement layer 210 comprises a metal, such as a woven steel cable, however, in other embodiments, the reinforcement layer 210 can be made of any hose material that will not be cut, sheared or pulverized by the compression between the stem and ferrule hose grippers 105b, 105c and 140d, 140e. This gripping action gives resistance to pump-off force on the fitting caused by internal pressure within the reinforced hose. Moreover, except for the gripper regions 105a and 140c, a fitting with reduced radial loading on the reinforced hose body, inside the cavity 145, allows for a thinner ferrule radial cross section which provides greater radial clearance inside the cavity 145 after ferrule 140 forming during fitting installation.

Figure 5:
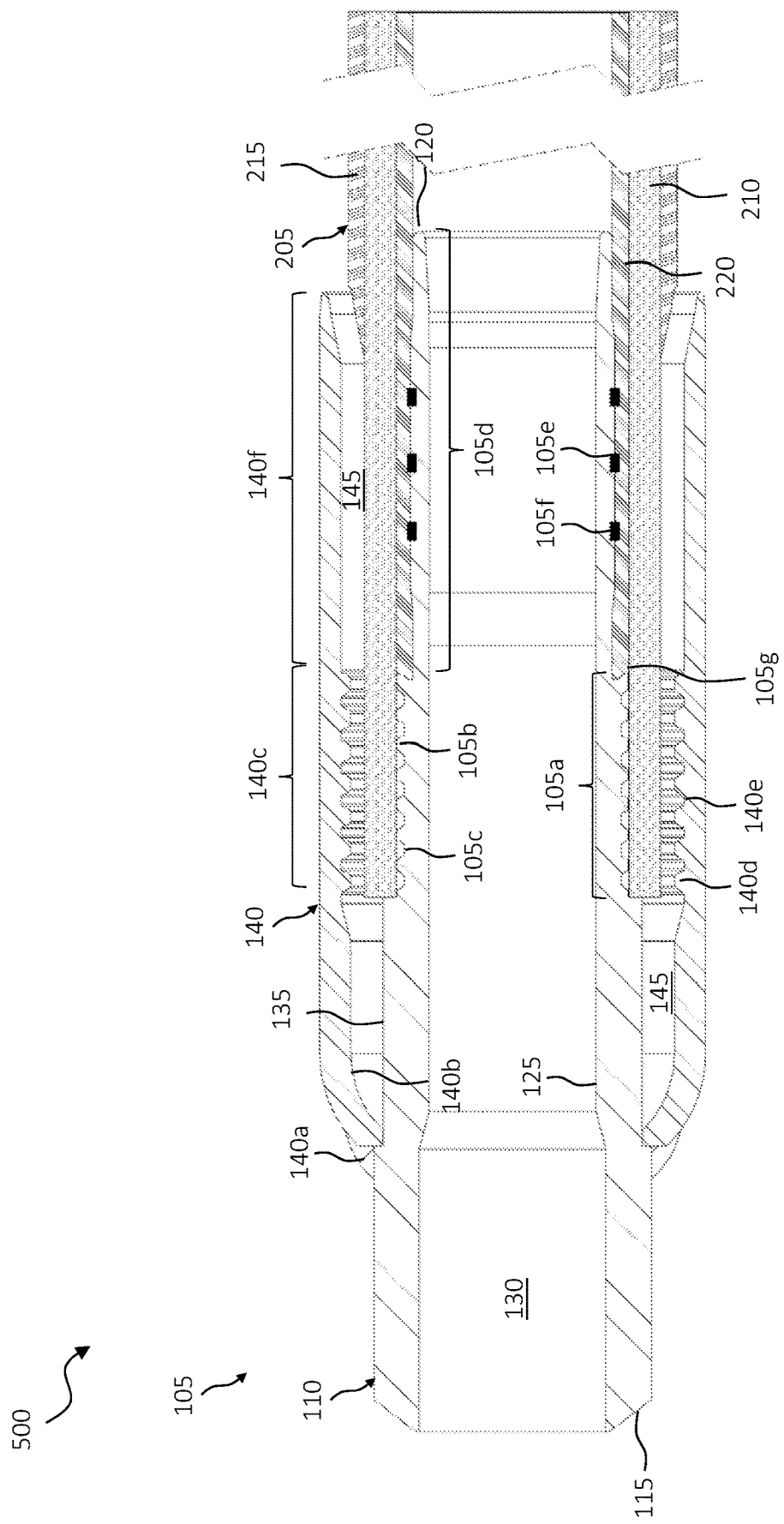
FIG. 5 is a sectional view of another embodiment of another hosing assembly implementing the end connector in which the outer cover and the inner liner of the reinforced hose are skived by the same amount.

FIG. 5 illustrates another embodiment of a reinforced hose assembly 500 in which the reinforced hose 205 is skived differently than in other embodiments. It should also be noted that FIG. 5 illustrates the connector and reinforced hose assembly 500 prior to any stem expansion of ferrule forming processes. In discussing this embodiment, where similar features of other embodiments as previously discussed are present, the same reference designations are used for those similar features. However, unlike in other embodiments and depending on a particular hose construction, the outer cover 215 of the reinforced hose 205 is not skived back to the hose receiver end 120. Instead, it is skived back the same length as the inner liner 220, but both are skived back to a length sufficient to expose the reinforcement liner 210 between the first and second hose gripper regions. Along with the other advantages discussed herein, skiving the out cover 215 and the inner liner 220 the same distance, provide reduced manufacturing time and costs. Further, the added length of the outer cover 215 being located within the cavity 145 will tend to keep the outer cover 215 in place longer during severe stress or strain operations on the reinforced hose.

Figure 6:
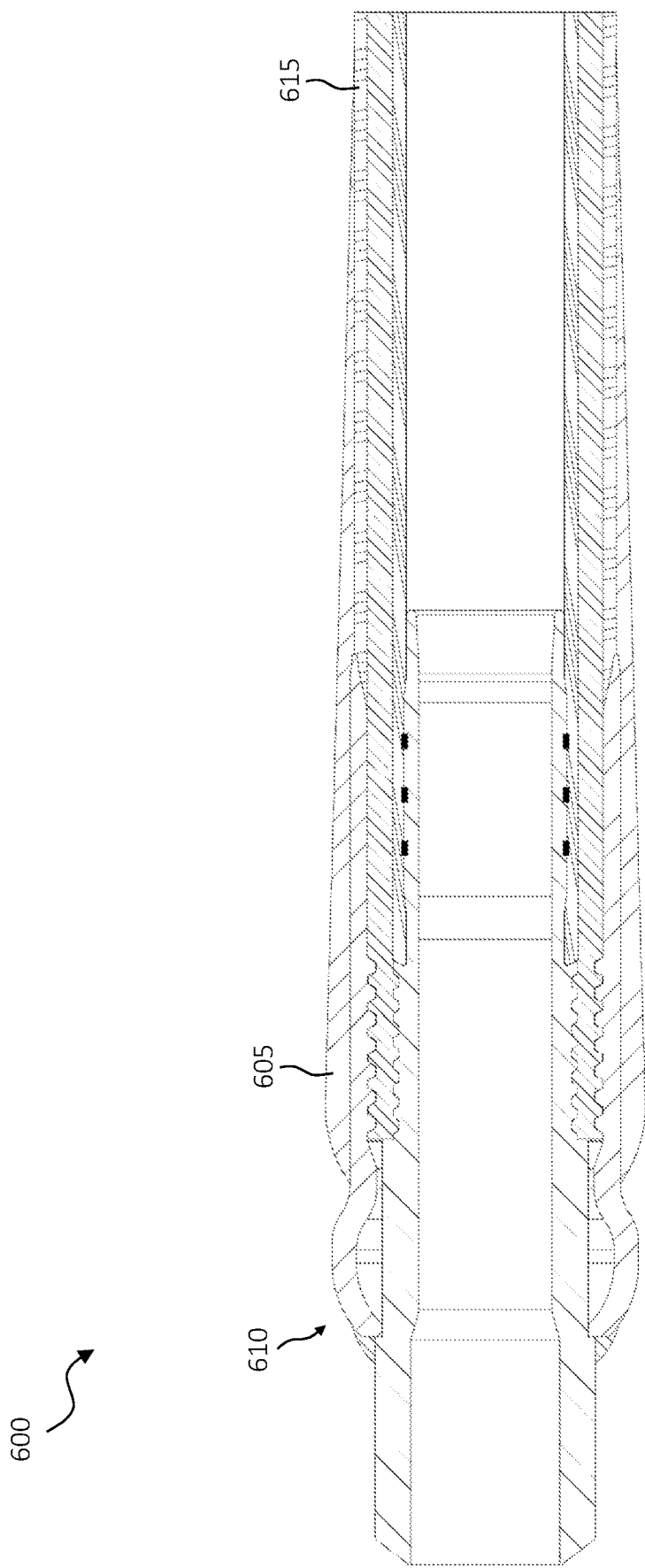
FIG. 6 is a sectional view of a hose assembly illustrating a bend stiffener that covering the end connector and reinforced hose.

FIG. 6 illustrates an embodiment of a reinforced hose assembly 600 having a bend stiffener 605 located over a portion of the end coupler 610 and a portion of the reinforced hose 615. The end connector 610 and reinforced hose 615 may be any embodiment of the end couplers and reinforced hoses, as covered by this disclosure. In one embodiment, the bend stiffener 605 comprises a molded or machined nylon or polyurethane material. However, other known materials of having similar strength and application properties may be used. In one embodiment, the bend stiffener 605 may have a cross section that tapers from a thicker cross section over the end connector 610 to a thinner cross section along a length of the reinforced hose 615. Prior to installing the end connector 610, the bend stiffener 605 is pulled onto the cut end of the hose and slid inboard of the end connector 610 area. After end connector's 610 installation, a glue, such as a flexible, high-strength adhesive, is applied to either one or both of the inner liner of the bend stiffener and the applicable surfaces of the end connector 610 and the reinforced hose 616. The bend stiffener 604 is then pulled outboard over the end connector 610 to glue it to the end connector's 610 and reinforced hose's surface 615. Other suitable alternate gluing methods can also be used. Because a flexible, high-strength adhesive is used no vulcanization is required. The adhesive has high strength adhesion characteristics that provide significant adhesion of the bend stiffener to the end connector's 610 OD surface and the reinforced hose's 615 OD surface. The bend stiffener 605 prevents the whole assembly from buckling at the end connector/reinforced hose interface. Moreover, because of the flexible, high-strength adhesive, there is less chance of the reinforced hose 615 being damaged or weakened by a vulcanization process.

Figure 7:
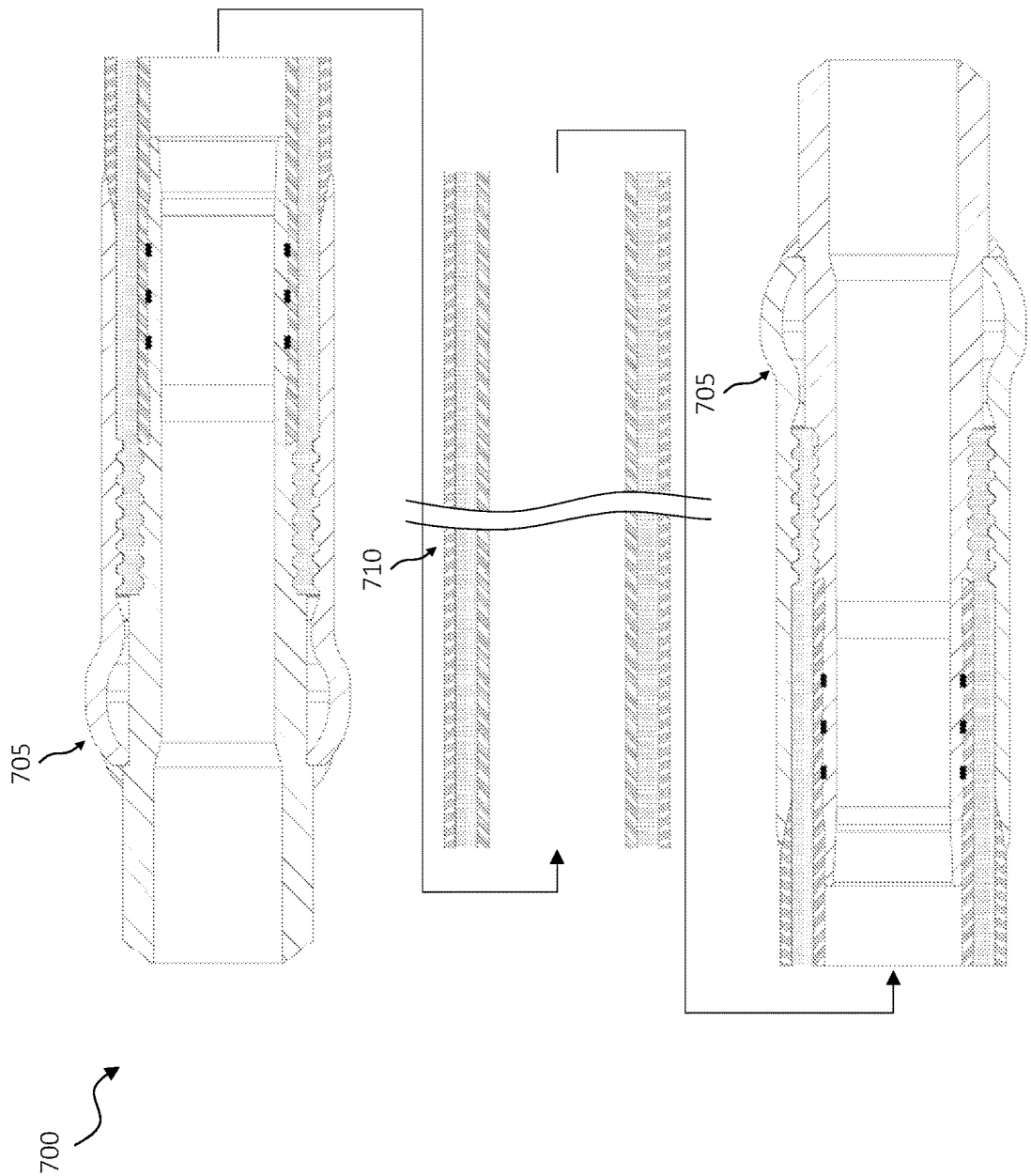
FIG. 7 is a sectional view of a hose assembly having an end connector coupled onto each end.

FIG. 7, illustrates a hose assembly 700 wherein an embodiment of an end coupler 705 as presented herein is attached to opposing ends of a reinforced hose by the processes discussed herein.

The embodiments of this disclosure provide advantages over previous connector/reinforced hose assembly designs. Previous designs have presented sign-wave (no gripper or cable-lock) fittings to enable the fitting to better hold against pump-off force. However, it has since been found that the ferrule and stem bumps put more axial shear stress on the hose rubber inner liner. Once the interface between the ferrule and the cable goes from a static grip to a dynamic grip with a lower steel to steel dynamic coefficient of friction the fitting can catastrophically fail. This condition is possible because the ability of the ferrule to frictionally and statically grip the reinforcement layer is a function of how much compression force is needed to hold it in the fitting between the ferrule and stem, which is limited by the amount of compression force that can be applied to the rubber inner liner withhold rubber cold flow that lowers the initial compression obtained during the ferrule forming process. Furthermore, any rupture to the inner liner will cause the fitting to leak.

Prior fitting designs required methods that first internally expanded the stem, which shortens stem length and then externally swaging the ferrule, which extends the ferrule length in decreasing axial expansions moving from the inboard section of the fitting towards the outboard or assembly end. It has been presently realized that these axial movements of both stem and ferrule means that the inner liner can cycle through severe radial compression and axial shear stresses-strains until the installation process ends and the peaks on the stem are properly radially aligned with valleys on the ferrule and vice versa. In proto-type work, even though cut-a-ways show no visible inner liner damage from fitting installation, the concern remains that there is strain damage in the inner liner, or in its interface with other layers of the hose construction, or in the fabric under the steel reinforcing or in the tie gum in and between the reinforcing plies beyond what can be visually seen.

It has also been presently discovered that during a ferrule forming operation, such as swaging, in some cases, the die design, die exterior envelope and swaging distance for each swage, for each size fitting, must be carefully controlled, otherwise a fitting that has been properly aligned during most of the swage operation can be badly pulled out of alignment during the last few inches of swaging. In this case the ferrule that went into proper alignment during the first three quarters of the swage was pulled toward the assembly end and out of alignment at the end of the swage.

To address these concerns, the present disclosure presents an improved coupler that is attached to a hose assembly and has, in one embodiment, a substantially smooth section near a hose received or inboard end. In another aspect, a two-step swaging procedure is used where the first swage just "kisses", or barely touches, the skived hose so only the stem elongation from the second swage stresses the hose inside the fitting connection.

Given the above problems, the embodiments of the present disclosure presents a coupler that locks the ferrule to the cable and through the end section of inner diameter (ID) skived hose and locks the whole multi-cable reinforcing cross section to the stem in a steel to steel to steel lock that is achieved under less compression than the prior designs.

As seem from the following embodiments, attributes of the new fitting can be generally described as follows: a gripper section that is present to firmly grip the hose reinforcing cables (wires) between the skived hose OD reinforcing and the internally skived first inner layer of the hose reinforcing; all the hose reinforcing gripped between the fitting ferrule and fitting stem. Once past the gripper section, a ferrule that is smooth on the ID surface free of barbs or lands and generally of a constant ID throughout its axial length is also present. Additionally, once past the gripper section of the stem, a stem section that is smooth, free of barbs etc. throughout its OD axial length except for one or more radially machined grooves to hold elastomeric seals that protrude to a greater diameter than the stem OD surface. An option for a stem that is internally expanded to more tightly contact the hose inner liner and provide for greater ID clearance through the fitting is also provided by this disclosure. Except in the fitting's gripper section, a fitting that has sustainably reduced internal compression on the hose structure allowing pressure cycle loading to be more gradually dampened as it enters from the unrestrained hose into and out of the more restrained hose inside of the coupling. Except for the gripper section a fitting with reduced radial loading on the hose body, inside the fitting allowing for a thinner ferrule radial cross section which allows for greater radial clearance inside the fitting after ferrule expansion during fitting installation. In certain embodiments, a stem with multiple elastomeric seals, so if the first upstream seal fails the second upstream seal may hold the pressure, etc. In certain embodiments, a ferrule of the right radial cross section and right clearance over the skived OD hose reinforcing such that during swaging it can be brought beyond yield strength for each of two swagings where the first swaging stands the ferrule ID slightly clear of the skived hose thus allowing the axial elongation caused by the ferrule diameter reduction to only stress the hose inside the coupling during the second swage. A hard-tapered semi-rigid molded nylon or some similar type of strong material that can be slid over the hose before fitting installation and then pulled over the swaged ferrule and then glued to the hose and ferrule with a strong flexible high strength adhesive, such as a commercially available adhesive under the commercial name of 3M5200, manufactured by 3M. This adhesive reduces the tendency for reinforced the hose to buckle where it enters the fitting should the hose be supported by the fitting positioned at a sharp angle to the hose axis.

The invention having been generally described, the following embodiments are given by way of illustration and are not intended to limit the specification of the claims in any manner.

Embodiments Herein Comprise:

An end connector for a reinforced hose, comprising: a stem having an inner diameter (ID) and outer diameter (OD), a coupler end, and a hose receiver end, and a fluid passageway defined by the ID. The OD includes a first hose gripper region located adjacent the coupler end that defines a first length of the stem. A second length of the OD extends from the first hose gripper region to the hose receiver end. The second length has a substantially smooth surface, except for one or more grooves for sealing elements formed therein. In this embodiment, one or more grooves for sealing elements that are formed in the substantially smooth surface are also present. A ferrule is attached to the stem at ferrule coupling point, and has an ID, including a second hose gripper region that opposes the first hose gripper region and defines a first length of the ferrule. A second length of the ID of the ferrule opposes the second length of the stem and the second length of the ferrule has a substantially smooth surface. A cavity is located between the OD of the stem and the ID of the ferrule that extends from the ferrule coupling point to the end of the ferrule, the cavity is configured to receive an end of a reinforced hose therein.

A reinforced hose assembly, comprising: a stem having an inner diameter (ID) and outer diameter (OD), a coupler end, and a hose receiver end, and a fluid passageway defined by the ID. The OD includes a first hose gripper region located adjacent the coupler end that defines a first length of the stem. A second length of the OD extends from the first hose gripper region to the hose receiver end. The second length has a substantially smooth surface, except for one or more grooves for sealing elements formed therein. In this embodiment, one or more grooves for sealing elements that are formed in the substantially smooth surface are also present. A ferrule is attached to the stem at ferrule coupling point and has an ID, including a second hose gripper region that opposes the first hose gripper region and defines a first length of the ferrule. A second length of the ID of the ferrule opposes the second length of the stem and the second length of the ferrule has a substantially smooth surface. A cavity is located between the OD of the stem and the ID of the ferrule that extends from the ferrule coupling point to the end of the ferrule, the cavity is configured to receive an end of a reinforced hose therein. A reinforced hose is coupled to the end connector and has, an inner liner, an outer cover, and a reinforcement layer located between the inner liner and the outer cover. A first end of the reinforced hose has a skived section that exposes a portion of the reinforcement layer. The first end is received within the cavity such that the exposed reinforcement layer is gripped by the first and second grippers between the first and second gripper regions, and where the inner liner engages one or more sealing elements.

A method for fabricating a reinforced hose assembly, comprising; inserting a skived end of a reinforced hose into a gripper region of an end connector, the gripper cavity being located between an outer diameter (OD) of the stem and an inner diameter (ID) of a ferrule attached to the stem at a ferrule coupling point, the skived end having an exposed reinforcement layer and inserting the skived end within the gripper cavity, positions an inner liner of the reinforced hose adjacent the gripper region and positions the inner liner against one or more sealing elements located in a substantially smooth length of an outer diameter (OD) of the stem that extends from the hose inner liner dam to a hose receiver end of the stem; and performing one or more ferrule forming operations and causing hose grippers of the stem and the ferrule to contact and force the exposed reinforcement layer between the hose grippers.

Element 1: wherein the first and second hose gripper regions includes hose grippers.

Element 2: wherein the first hose grippers comprises stem circumferential spines and grooves and the second hose grippers comprises ferrule circumferential spines and grooves.

Element 3: wherein the second length of the stem includes a hose inner liner dam, the first hose gripper region extending to the hose inner liner dam, and the second hose gripper region extending to a point approximately radially opposite the hose inner liner dam.

Element 4: wherein each of the one or more grooves for sealing elements has a sealing element received therein.

Element 5: wherein at least a portion of the fluid passageway along the second length of the stem has a diameter that is less than a diameter of the fluid passageway along the first length of the stem.

Element 6: wherein the skived first end is skived such that the outer cover and the inner liner are skived to expose a portion of the reinforcement layer corresponding to at least a length of the first and second gripper regions, and wherein the skived ends of the outer cover and inner liner are positioned within the cavity and radially opposite each other.

Element 7: wherein the first hose grippers of the stem comprise stem circumferential spines and grooves and the second hose grippers of the ferrule comprise ferrule circumferential spines and grooves.

Element 8: wherein the one or more grooves for sealing elements comprises three grooves and a sealing element is received in each groove.

Element 9: further comprising a bend stiffener located over the reinforced hose and the low compression end connector.

Element 10: wherein, the bend stiffener comprises a molded or machined nylon or polyurethane material, covering a portion of the end connector and a portion of the reinforced hose, the bend stiffener tapering from a thicker cross section over the end connector then tapering to a thinner cross section over a length of the outer cover of the reinforced hose.

Element 11: wherein the bend stiffener is adhesively attached to the end connector and hose outer cover with a high strength adhesive.

Element 12: wherein the end coupler is a first end coupler and the reinforced assembly further comprises a second one of the end coupler located on a second end of the reinforced hose.

Element 13: wherein an outer diameter of the reinforced hose within the second cavity smooth length in the cavity has a maximum compression of about 10%.

Element 14: wherein the reinforced hose located within the gripper cavity has a first diameter and wherein the performing one or more ferrule forming operations causes the diameter of the reinforced hose within the cavity of the second smooth length of the ferrule to have a maximum compression of about 10%.

Element 15: wherein performing the one or more ferrule forming operations further includes performing a prior ferrule forming operation, such that the hose gripper of the stem and the hose grippers of the ferrule are brought into proximity to the OD of the reinforcement layer without contacting the reinforcement layer.

Element 16: wherein inserting the skived end includes positioning an outer layer of the reinforcement hose in a cavity between the outer surface of the stem and the inner surface of the ferrule to a position approximately radially opposite a hose inner liner dam.

Element 17: further comprising expanding a reduced diameter inner section of the substantially smooth length of the stem to cause the inner liner to be engaged against the one or more sealing elements and the substantially smooth length of the stem, prior to performing the one or more ferrule forming operations.

Element 18: further comprising placing a bend stiffener over the hose and the end connector subsequent to performing the ferrule forming operation.

Element 19: wherein placing the bend stiffener includes applying a flexible, high-strength adhesive to an interior surface of the bend stiffener to glue the bend stiffener onto the end connector and the reinforced hose.

Element 20: further comprising expanding a radius of a fluid passageway of the end connector that extends along the substantially smooth section length of the stem from a first radius to a second radius.

Element 21: further comprising bringing a longitudinal axis of the hose into alignment with a longitudinal axis of the end connector as the reinforced hose is inserted into the end connector cavity.

Those skilled in the art to which this application relates will appreciate that other and further additions, deletions, substitutions and modifications may be made to the described embodiments.

What is claimed is:

1. An end connector for a reinforced hose, comprising:
   a stem having a stem inner diameter (ID), a stem outer diameter (OD), a stem coupler end, a stem hose receiver end, and a fluid passageway defined by the stem ID, the stem OD including a first hose gripper region that is located adjacent the stem coupler end and defines a first stem length, a first region that extends entirely from the first hose gripper region to the stem hose receiver end and defines a second stem length and is free of protrusions, the first region having a first surface;
   one or more grooves for sealing elements formed in the first surface;
   a ferrule having a ferrule inner diameter (ID), a ferrule outer diameter (OD), a ferrule coupler end, and a ferrule hose receiver end, the ferrule attached to the stem at the ferrule coupler end, the ferrule ID including a second hose gripper region that opposes the first hose gripper region and defines a first ferrule length, a second region that extends entirely from the second hose gripper region to the ferrule hose receiver end and defines a second ferrule length and is free of protrusions, the second region having a second surface, and further wherein the second region is at least partially radially aligned with the one or more grooves formed in the first surface, wherein the first hose gripper region includes first hose grippers and the second hose gripper region includes second hose grippers; and
   a cavity located between the stem OD and the ferrule ID that extends from the ferrule coupler end to the ferrule hose receiving end, the cavity configured to receive an end of a reinforced hose therein.

2. The end connector recited in claim 1, wherein the first hose grippers comprise stem circumferential spines and grooves and the second hose grippers comprise ferrule circumferential spines and grooves.

3. The end connector recited in claim 1, wherein the second stem length includes a hose inner liner dam, the first hose gripper region extending to the hose inner liner dam, and the second hose gripper region extending to a point radially opposite the hose inner liner dam.

4. The end connector recited in claim 1, further including a sealing element received in each of the one or more grooves for sealing.

5. The end connector recited in claim 1, wherein the stem ID has a first stem ID along at least a portion of the first stem length and a second stem ID along at least a portion of the second stem length, and further wherein the second stem ID is less than the first stem ID.

6. A reinforced hose assembly, comprising:
   an end connector, comprising:
      a stem having a stem inner diameter (ID), a stem outer diameter (OD), a stem coupler end, a stem hose receiver end, and a fluid passageway defined by the stem ID, the stem OD including a first hose gripper region that is located adjacent the stem coupler end and defines a first stem length, a first region that extends from the first hose gripper region to the stem hose receiver end and defines a second stem length and is free of protrusions, the first region having a first surface;
      one or more grooves for sealing elements formed in the first surface;
      a sealing element received in each of the one or more grooves for sealing elements;
      a ferrule having a ferrule inner diameter (ID), a ferrule outer diameter (OD), a ferrule coupler end, and a ferrule hose receiver end, the ferrule attached to the stem at the ferrule coupler end, the ferrule ID including a second hose gripper region that opposes the first hose gripper region and defines a first ferrule length, a second region that extends from the second hose gripper region to the ferrule hose receiver end and defines a second ferrule length and is free of protrusions, the second region having a second surface, and further wherein the second region is at least partially radially aligned with the one or more grooves formed in the first surface; and
      a cavity located between the stem OD and the ferrule ID that extends from the ferrule coupler end to the ferrule hose receiving end, the cavity configured to receive an end of a reinforced hose therein; and
   a reinforced hose coupled to the end connector and having, an inner liner, an outer cover, and a reinforcement layer located between the inner liner and the outer cover, a first end of the reinforced hose having a skived section that exposes a portion of the reinforcement layer as an exposed reinforcement layer, the first end being received within the cavity such that the exposed reinforcement layer is gripped by the first and second hose gripper regions, the inner liner engaging the sealing element received in each of the one or more grooves for sealing elements.

7. The reinforced hose assembly recited in claim 6, wherein the skived first end is skived such that the outer cover and the inner liner are skived to expose a portion of the reinforcement layer corresponding to at least a length of the first and second hose gripper regions, and wherein the skived ends of the outer cover and inner liner are positioned within the cavity and radially opposite each other.

8. The reinforced hose assembly recited in claim 6, wherein the first hose gripper region includes first hose grippers and the second hose gripper region includes second hose grippers, and further wherein the first hose grippers comprise stem circumferential spines and grooves and the second hose grippers comprise ferrule circumferential spines and grooves.

9. The reinforced hose assembly recited in claim 6, wherein the one or more grooves for sealing elements comprises three grooves.

10. The reinforced hose assembly recited in claim 6, further comprising a bend stiffener located over the reinforced hose and the end connector.

11. The reinforced hose assembly recited in claim 10, wherein, the bend stiffener comprises a molded or machined nylon or polyurethane material, covering a portion of the end connector and a portion of the reinforced hose, the bend stiffener tapering from a thicker cross section over the end connector to a thinner cross section over the outer cover.

12. The reinforced hose assembly recited in claim 11, wherein the bend stiffener is adhesively attached to the end connector and outer cover with a flexible adhesive.

13. The reinforced hose assembly recited in claim 6, wherein the end connector is a first end connector and the reinforced assembly further comprises a second end connector located on a second end of the reinforced hose.

\* \* \* \* \*